Dec. 30, 1930.  W. E. SHEHAN ET AL  1,786,635
CLOSED CAR WIND WING BRACKET
Filed July 17, 1928

INVENTOR.
William E. Shehan
and Godfrey Bell
BY Nestall and Wallace
ATTORNEYS

Patented Dec. 30, 1930

1,786,635

UNITED STATES PATENT OFFICE

WILLIAM E. SHEHAN AND GODFREY BELL, OF LOS ANGELES, CALIFORNIA

CLOSED-CAR WIND-WING BRACKET

Application filed July 17, 1928. Serial No. 293,426.

The objects of this invention are to provide wind wing structures with any or all of the following features: holding members for the glass or shield such that the wings may be moved angularly with respect to the window; holding members providing for adjustable spaced relation of the shield carriers so as not to require extreme accuracy in attachment to the body of the vehicle, and holding members of novel, simple, inexpensive and durable construction, easy to install and to adjust.

These objects together with other objects and corresponding accomplishments are obtained by means of the embodiment of our invention illustrated in the accompanying drawing, in which:—

Figure 1:
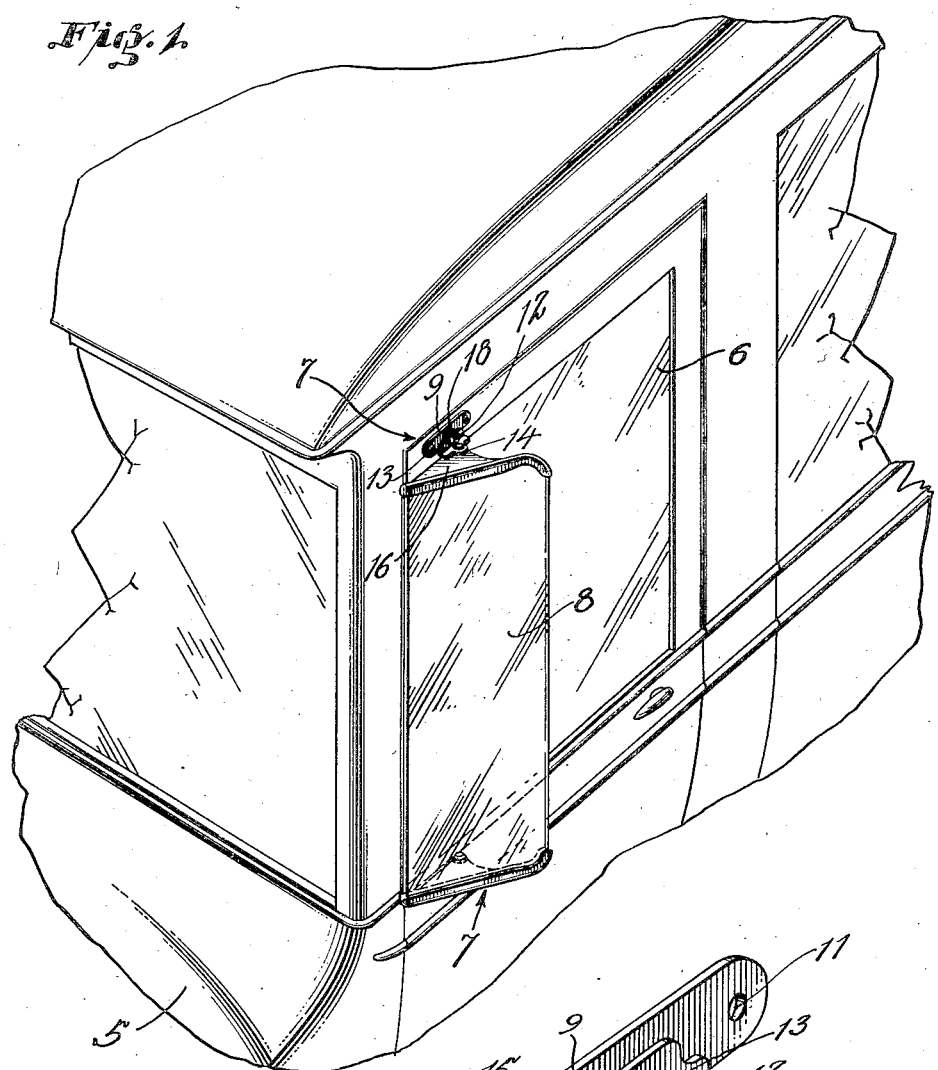
Figure 2:
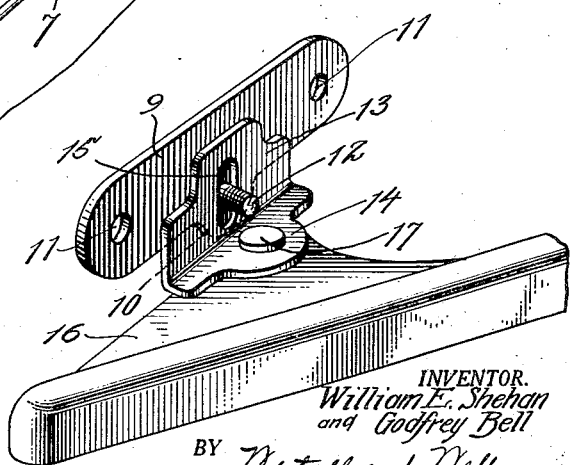

Fig. 1 is a perspective view of a fragment of an automobile body with a wind wing secured thereto by our improved brackets; and Fig. 2 is a perspective view on an enlarged scale of a top bracket.

Referring more particularly to the drawing, 5 marks a fragment of a closed car body having a window 6. Attached to the body at the window frame are a pair of shield holding members indicated generally by 7. These holding members carry a glass or shield 8.

The invention resides particularly in the holding members, each of which comprise an attachment bracket member of T shape having a head 9 and a leg 10. The attachment member is preferably stamped out of a metal plate and is provided with bolt or screw holes 11 for securing the attachment member to the body. A bolt 12 projects from the attachment member. A supporting bracket member is secured to the attachment member and comprises an angle stamped from a plate having legs 13 and 14 with an elongated bolt hole 15. An outstanding shield carrier 16 is preferably of triangular form. At the apex of the shield carrier is an opening to receive a pintle 17 which extends through the leg or ledge 14 of the bracket member serving to pivotally secure them together in adjustable relation so that the angular position of the ledge may be varied. A nut 18, shown in Fig. 1, serves to clamp the attachment member to the supporting bracket member in adjustable position to take care of inaccuracies in the location of the attachment members. The shield carrier members are provided with grooves to receive the upper and lower edges of the glass panel 8.

In mounting the holding member upon the body, the attachment bracket members are secured in position. The wind wings with the shield carriers and supporting members attached are then secured by the bolts 12 to the attachment bracket member, adjustments being made to accommodate the parts. The nuts 18 are then tightened. It will be noted that the attachment members may be turned over or reversed in position thereby obtaining a maximum of adjustment.

What we claim is:—

In a wind deflector for a vehicle, the combination of a pair of shield holding members adapted to be secured to the vehicle body in spaced relation, one of said holding members comprising a T shape attachment member with a leg, a supporting bracket having a leg and an outstanding ledge, said legs being provided with bolt holes, one of said bolt holes being elongated, a bolt adjustably securing said legs together so as to adjustably position the ledge laterally of said supporting bracket, and shield carrier members pivotally secured to said supporting bracket at said ledge and to the other holding member.

In witness that we claim the foregoing we have hereunto subscribed our names this 5th day of June, 1928.

WILLIAM E. SHEHAN.
GODFREY BELL.